Sept. 3, 1963  S. LASH  3,102,741
REPLACEABLE FLUIDTIGHT FILTER HOLDER
Filed Nov. 18, 1959

INVENTOR.
SEYMOUR LASH
BY
ATTORNEY

United States Patent Office 3,102,741
Patented Sept. 3, 1963

3,102,741
REPLACEABLE FLUIDTIGHT FILTER HOLDER
Seymour Lash, 40 Fox Place, Hicksville, N.Y.
Filed Nov. 18, 1959, Ser. No. 853,985
1 Claim. (Cl. 285—332.3)
(Granted under Title 35, U.S. Code (1952), sec. 266)

The invention described herein may be manufactured and used by or for the Government of the United States of America for governmental purposes without the payment of any royalties thereon or therefor.

This invention relates to a replaceable, fluidtight filter holder and especially to a replaceable, fluidtight filter holder for use with impermeable clothing.

There are circumstances in the military service and in the industrial sphere which require that personnel be protected from toxic gases and highly corrosive vapors or liquids. For protection against such hazards, some type of protective suit, usually made of a coated rubberized fabric impermeable to moisture vapor and air, is generally provided. Such suits are supplied with air either through a portable air supply carried by the wearer, a hose connected to a fixed air supply, or ventilating openings in the suit.

Of course, such ventilating openings must be covered by filters which are capable of absorbing the toxic gases and corrosive vapors that may be encountered. The filters must be attached to the suit in a fluidtight manner and it is extremely desirable that the filters be easily and speedily removable and replaceable.

In the present invention, these functions are accomplished by a two-section filter holder, one section being secured permanently to the suit and the second section being easily removable from the first. The second section carries the filter and makes fluidtight contact with the first section when the two sections are assembled in working condition.

An object of this invention is to provide an easily replaceable, fluidtight filter holder for use with protective envelopes or incasements which are impervious to gases and vapors.

Other objects and many of the attendant advantages of this invention will be readily appreciated as the same becomes better understood by reference to the following detailed description when considered in connection with the accompanying drawings wherein.

Figure 1:
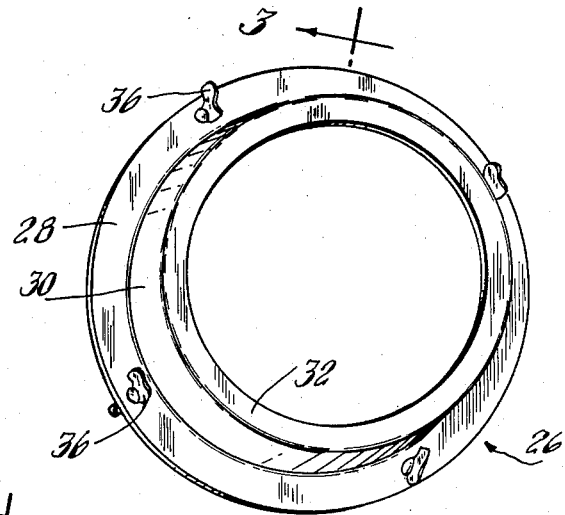
FIG. 1 is a perspective view of the removable section of a filter holder, showing a preferred embodiment of the invention.
Figure 2:
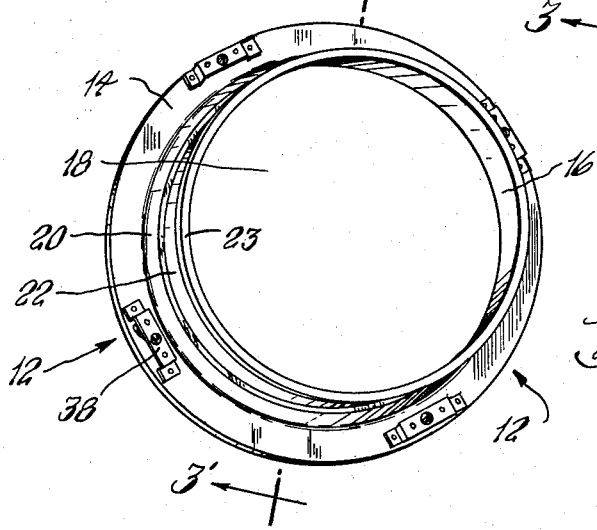
FIG. 2 is a perspective view of the fixed section thereof.
Figure 3:
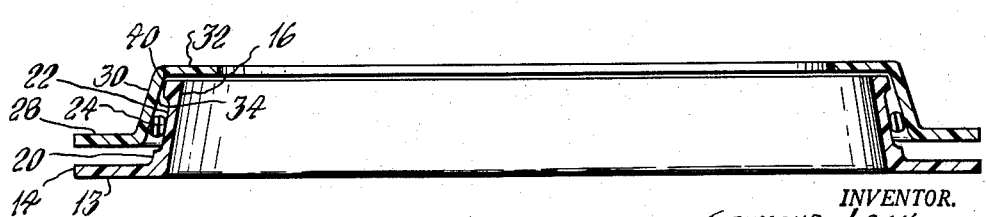

FIG. 3 is a cross-sectional view of the embodiment shown in FIGS. 1 and 2 taken along the lines 3—3 and 3'—3'.

Similar numerals refer to similar parts throughout the several views.

The invention comprises two sections, the replaceable section which carries the filter being shown in FIG. 1 and the section which is affixed to the impermeable suit, or other incasement, being shown in FIG. 2. The fixed section 12 has a disc-shaped base, or flanged portion 14, from the inner edge of which rises a circular wall 16. This fixed section 12 may also be visualized as being constructed from a disc (the base) and a hoop (the wall), the hoop being attached to the inner edge of the disc.

The base 14 of the fixed section 12 has a flat bottom 13 to which the edges of an excised portion of the impermeable suit may be cemented with any suitable cement which is impervious to fluids and corrosive vapors. The shape of the excised portion of the suit may preferably be circular, corresponding in area to the circular central opening 18 which is encompassed by the wall 16. The outer surface 20 of the wall 16 is formed with an excised portion 22 which covers a considerable extent of the distance between the top 23 of the wall 16 and the base 14. The shape of the opening 18 encompassed by the wall 16, and therefore of the wall itself, is shown here as circular although obviously, it is not necessarily limited to this particular geometrical configuration but may be square or rectangular, etc.

The outer surface 20 of the wall 16 and the corresponding surface of the wall within the excised portion 22 are tapered with the perimetric dimension (the long dimension comprising a circle around the surface of the wall) increasing from the top of the wall to the base 14.

A loop, or O ring, 24 of resilient material impervious to fluids and corrosive vapors, such as rubber, is fitted into the excised portion 22 of the wall 16. The normal inner diameter of this loop 24 corresponds to the perimetric dimension of the upper, or narrower, part of the excised portion 22 so that the loop 24 must be stretched to bring it down toward the base and it tends to return to the upper part of the excised portion 22 when no downward force is exerted upon it. The cross sectional area of the loop 24 is large enough so that the loop 24 projects past the outer surface 20 of the wall 16.

The replaceable section 26 of the invention is shown in FIG. 1 and consists of a disc-shaped base, or flanged portion, 28, a wall 30 rising from the inner edge of the base 28 and a flange 32 extending inwardly from the top of the wall 30. The top surface of the flange 32 is flat and the filter can be cemented thereto with any suitable cement which is impervious to fluids and corrosive vapors, the filter may also be affixed to the lower surface of the flange 32 or to the inner surface 34 of the wall 30 by any other suitable means, if so desired. The filter holder sections 12 and 26 are fabricated from a material which is rigid and impervious to fluids and corrosive vapors, for example, fiber-glass reinforced plastic. Many plastics may be utilized, a satisfactory one being polyester plastic. Other materials which may be used include varnished wood and various metals, especially in applications where the environment will not contain corrosive vapors.

The inner surface 34 of the wall 30 is tapered somewhat more sharply than the outer surface 20 of the wall 16. Typical degrees of taper would be two degrees from the vertical for the fixed-section wall 16 and five degrees for the replaceable-section wall 30.

The base 28 of the replaceable-section wall 30 carries the male members 36 of four Dzus fasteners spaced at 90 degree intervals; the base 14 carries the female members 38 at corresponding intervals. Any other convenient means of removably clamping together the two sections of the filter holder may also be used; for example, four horizontal pegs, or spikes, might extend from the surface 40 near the top of the fixed-section wall 16 to slide into correspondingly placed vertical grooves in the inner surface 34 of the wall 30 when the replaceable section 26 is forced down upon the fixed section 12 in the position shown in FIG. 3. A series of closely spaced horizontal grooves connecting with each vertical groove would allow the replaceable section 26 to be twisted slightly so that it could be locked in place when the downward limit of its movement is reached. This would comprise a bayonet-type clamp.

When the filter holder is assembled, the replaceable section 26 is pressed down upon the fixed section 12. The difference in the degree of taper of the surfaces 20 and 34 causes the loop 24 to be forced downward and tightly compressed between the inner surface 34 of the replaceable-section wall 30 and the surface of the excised portion 22 of the fixed-section wall 16. This effects a fluidtight closure between the two filter-holder sections. The Dzus fasteners are then closed so that the two sections are held together securely. The difference in the taper of the walls permits automatic compensation for variable factors such as wearing of the loop 24 or variations in size of the fixed and replaceable sections.

When the filter carried by the replaceable section 26 is no longer effective in its filtering action, the Dzus fasteners are opened, the replaceable section 26 is removed and a new replaceable section with an unused filter is substituted for the old one. The entire operation can be accomplished within a few seconds.

Obviously many modifications and variations of the present invention are possible in the light of the above teachings. It is therefore to be understood that within the scope of the appended claim the invention may be practiced otherwise than as specifically described.

I claim:

A replaceable, fluidtight filter holder comprising, in combination: a first section of rigid, fluid-impervious material having a base and a flange rising therefrom, said flange having an outer surface and an inner surface encompassing a central opening, the outer surface of said flange being tapered so that its long perimeter increases toward said base and being formed with an undercut between said base and the top of said flange, said undercut extending completely around the long perimeter of said flange and having a smooth tapered surface, the taper being similar to that of said outer surface; an elastomeric O-ring of fluid impervious material placed in said undercut and closely encircling the tapered surface of the undercut adjacent its smaller diameter in sealing relation thereto, and O-ring having a cross-sectional diameter greater than the depth of said undercut, and said O-ring being movable along said undercut with a rolling motion; a second section of rigid, fluid-impervious material having a base and a wall rising therefrom, said wall being of lesser axial extent than said flange and having an inner surface encompassing a central opening and corresponding in perimetric shape to that of the outer surface of said first-section flange but having a slightly greater taper so that when said second section is fitted over said first section with said bases being made to approach each other, said resilient loop is moved at least to the point at which the outer perimetric dimension of the undercut equals the normal inner perimetric dimension of said O-ring and said O-ring is tightly compressed between said inner surface of said second-section wall and said undercut flange of said first section thereby forming a fluidtight closure, the axial length of said undercut being sufficient to permit free rolling action of the O-ring along the undercut during assembly of said two sections; and means on said base members for removably fastening said sections to each other when they are fitted together to provide said fluidtight closure.

References Cited in the file of this patent

UNITED STATES PATENTS

| | | |
|---|---|---|
| 47,216 | Neuberger | Apr. 11, 1865 |
| 115,917 | Wharton | June 13, 1871 |
| 543,871 | Houze | Aug. 6, 1895 |
| 2,320,397 | Ross | June 1, 1943 |
| 2,687,229 | Laurent | Aug. 24, 1954 |
| 2,814,827 | Snow et al. | Dec. 3, 1957 |

FOREIGN PATENTS

| | | |
|---|---|---|
| 381,419 | Germany | Sept. 20, 1923 |
| 114,257 | Sweden | June 12, 1945 |